(12) United States Patent
Xiao et al.

(10) Patent No.: US 10,079,542 B2
(45) Date of Patent: Sep. 18, 2018

(54) HIGH VOLTAGE CURRENT SOURCE WITH SHORT CIRCUIT PROTECTION

(71) Applicant: Monolithic Power Systems, Inc., San Jose, CA (US)

(72) Inventors: Bin Xiao, Chengdu (CN); Yuedong Chen, Chengdu (CN)

(73) Assignee: Monolithic Power Systems, Inc., San Jose, CA (US)

( * ) Notice: Subject to any disclaimer, the term of this patent is extended or adjusted under 35 U.S.C. 154(b) by 359 days.

(21) Appl. No.: 14/951,268

(22) Filed: Nov. 24, 2015

(65) Prior Publication Data

US 2016/0156171 A1    Jun. 2, 2016

(30) Foreign Application Priority Data

Nov. 27, 2014   (CN) .......................... 2014 1 0699713

(51) Int. Cl.
```
H02H 3/08       (2006.01)
H02M 3/335      (2006.01)
H02H 7/125      (2006.01)
H02M 1/32       (2007.01)
H02M 1/36       (2007.01)
H02M 7/12       (2006.01)
H02M 1/00       (2006.01)
```
(52) U.S. Cl.
CPC ...... *H02M 3/33507* (2013.01); *H02H 7/1257* (2013.01); *H02M 1/32* (2013.01); *H02M 1/36* (2013.01); *H02M 7/12* (2013.01); *H02M 2001/0006* (2013.01)

(58) Field of Classification Search
CPC ...... H02M 3/33507; H02M 1/32; H02M 1/36; H02M 7/12; H02M 2001/0006; H02H 7/1257
See application file for complete search history.

(56) References Cited

U.S. PATENT DOCUMENTS

| | | | | |
|---|---|---|---|---|
| 5,812,383 | A * | 9/1998 | Majid | H02M 3/33523 363/19 |
| 8,587,973 | B2 | 11/2013 | Li | |
| 2002/0153938 | A1* | 10/2002 | Baudelot | H01L 27/098 327/430 |
| 2011/0309810 | A1* | 12/2011 | Willmeroth | H02M 1/36 323/282 |
| 2013/0141059 | A1* | 6/2013 | Parkhurst | H02M 3/156 323/271 |
| 2015/0162830 | A1* | 6/2015 | Dong | H02M 1/36 323/271 |

* cited by examiner

*Primary Examiner* — Zeev V Kitov
(74) *Attorney, Agent, or Firm* — Perkins Coie LLP

(57) ABSTRACT

A current source generating a charging current and a supply voltage by charging a capacitor with the charging current. The current source has a conversion circuit converting a line voltage into a second voltage, a current generation circuit generating the charging current based on the second voltage, and a control circuit controlling the current generation circuit based on the supply voltage. The charging current is controlled to be at a first current value when the supply voltage is lower than a first threshold voltage, the charging current is controlled to be at a second current value when the supply voltage is higher than a second threshold voltage. The first threshold voltage is lower than the second threshold voltage, and the first current value is lower than the second current value.

19 Claims, 3 Drawing Sheets

HIGH VOLTAGE CURRENT SOURCE WITH SHORT CIRCUIT PROTECTION

CROSS REFERENCE

This application claims the benefit of CN application No. 201410699713.1, filed on Nov. 27, 2014, and incorporated herein by reference.

FIELD OF THE INVENTION

This disclosure generally relates to electronic circuits, and more particularly but not exclusively to high voltage current source with short circuit protection.

BACKGROUND OF THE INVENTION

High voltage current sources are required in almost all AC-DC converters. A high voltage current source generates a charging current by converting a line voltage that is rectified from an AC voltage, such as a 220V AC voltage. A voltage is then generated by charging a capacitor with the charging current, and is further provided to supply a control circuit of a converter during the startup period.

The charging current of the traditional high voltage current source is simply converted from the line voltage, thus, the power dissipation is high and the reliability is bad.

Accordingly, an improved high voltage current source having low power dissipation and good reliability is required.

SUMMARY

Embodiments of the present invention are directed to a novel current source having an input and an output. The current source receives a line voltage at the input and provides a charging current at the output. The charging current is provided to charge a capacitor to generate a supply voltage at the output of the current source. The current source comprises a conversion circuit, a current generation circuit, and a control circuit. The conversion circuit converts the line voltage into a second voltage, which is lower than the line voltage. The current generation circuit receives the second voltage and generates the charging current. The control circuit is coupled to the current generation circuit. The control circuit receives the supply voltage, and controls the current generation circuit based on the supply voltage. The control circuit controls the current generation circuit such that the charging current is at a first current value when the supply voltage is lower than a first threshold voltage and at a second current value when the supply voltage is higher than a second threshold voltage. The first threshold voltage is lower than the second threshold voltage and the first current value is lower than the second current value.

Embodiments of the present invention are also directed to a novel method for supplying power to an isolation converter with short circuit protection. The method comprises: rectifying an AC voltage into a line voltage; converting the line voltage into a second voltage that is lower than the line voltage; generating a first current based on the second voltage and generating a second current based on the first current; and generating a charging current based on the second current through a current mirror. The charging current is provided to generate a supply voltage by charging a capacitor. The second current is controlled to be at a first current value when the supply voltage is lower than a first threshold voltage, and to be at a second current value when the supply voltage is higher than a second threshold voltage. The second threshold voltage is higher than the first threshold voltage and the second current value is higher than the first current value.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

The current source according to an embodiment of the present invention generates a charging current from a line voltage, wherein the current source has short circuit protection function and low power consumption.

Figure 1:
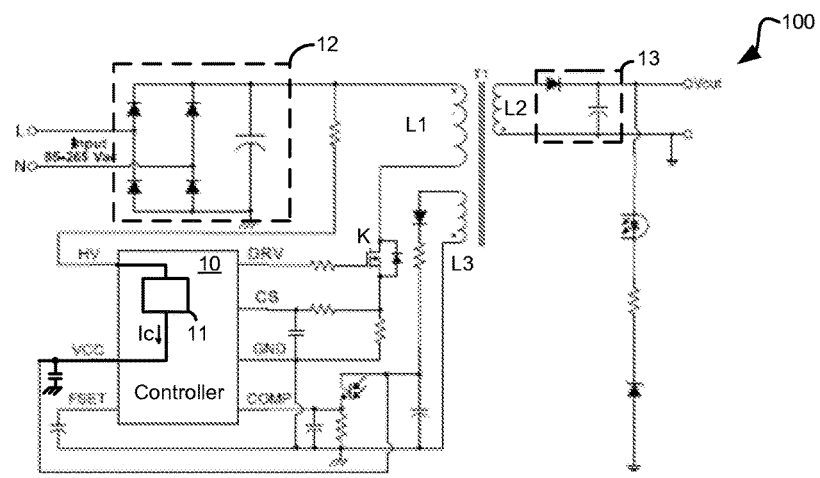
FIG. 1 illustrates a schematic diagram of an isolation conversion system 100 in accordance with an embodiment of the present invention.

FIG. 1 illustrates a schematic diagram of an isolation conversion system 100 in accordance with an embodiment of the present invention. Isolation conversion system 100 comprises a rectifier circuit 12, an isolation converter, a controller 10 and a current source 11. Isolation conversion system 100 is configured to convert an AC input voltage Vac, such as an AC voltage with a value of 85~265 volts, into a DC output voltage Vout to supply a load. In the shown embodiment, a flyback converter utilized in the isolation conversion system 100 comprises a primary winding L1, a main secondary winding L2 and an auxiliary secondary winding L3, a main switch K and an output filter circuit 13. An induced voltage is generated at the secondary winding L2 by switching the main switch K on and off, under the control of the controller 10 that is coupled to a control end of the main switch K. The induced voltage is then converted into the output voltage Vout through the filter circuit 13. It should be known that the current source in the embodiment of FIG. 1 may be also applied in another isolation conversion system comprising any other suitable type of converter besides the flyback converter, or in a non-isolation conversion system. Rectifier circuit 12 has an input configured to receive the AC input voltage Vac, and an output configured to provide a line voltage HV. The isolation converter has an input and an output, wherein the input of the isolation converter is coupled to the output of the rectifier circuit 12, and the output of the isolation converter is coupled to the load. The isolation converter comprises a primary winding L1, a main secondary winding L2 and an auxiliary secondary winding L3. The main secondary winding L2 is coupled to the output of the isolation converter, and the auxiliary secondary winding L3 is configured to provide a supply voltage VCC to the controller 10 during the normal operation of the isolation conversion system 100.

During the normal operation of the isolation conversion system 100, supply voltage VCC supplying power to the controller 10 and contributing to generate a feedback signal COMP is generated by switching the main switch K on and off. As shown in FIG. 1, the auxiliary secondary winding L3 is configured to generate the induced voltage by switching the main switch K on and off, wherein the induced voltage is provided to generate supply voltage VCC.

During the startup period of the isolation conversion system 100, the switching action of the main switch K is not in the normal work state, and the induced voltage provided by the auxiliary secondary winding L3 is not large enough to supply the controller 10. Thus, the current source 11 is used to supply power to the controller 10 during the startup period of the isolation conversion system 100. Current source 11 is configured to generate a charging current Ic based on the line voltage HV. And by charging a capacitor with charging current Ic, supply voltage VCC is generated. In this embodiment, current source 11 has a short circuit protection function. That is, charging current Ic generated by the current source 11 is small when supply voltage VCC approximates a ground voltage, to avoid heat accumulation. And charging current Ic is increased when supply voltage VCC increases to a predetermined value. And further, when the isolation conversion system 100 operates in the normal state, that is, when the induced voltage generated by the auxiliary winding L3 is large enough, current source 11 is shut down to decrease charging current Ic to zero.

Figure 2:
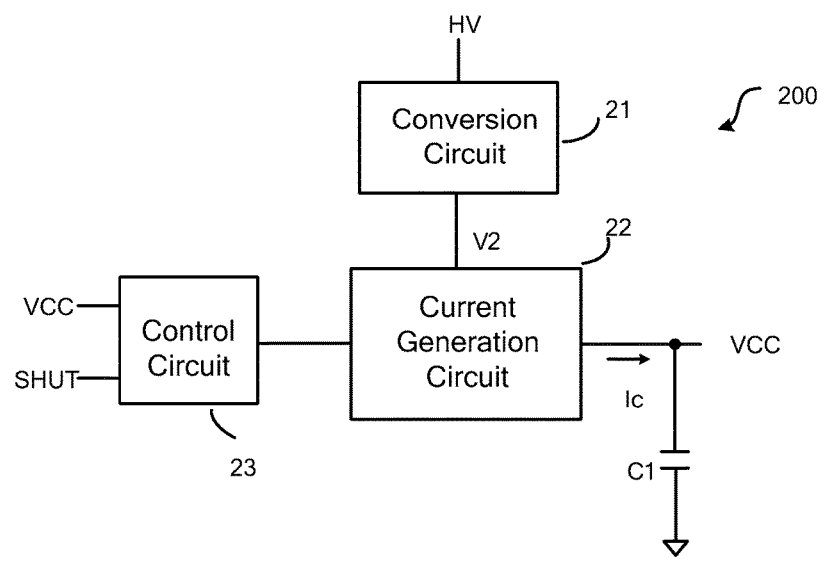
FIG. 2 illustrates a block diagram of a current source 200 in accordance with an embodiment of the present invention.

FIG. 2 illustrates a block diagram of a current source 200 in accordance with an embodiment of the present invention. Current source 200 is configured to generate a supply voltage VCC by charging a capacitor C1 with a charging current Ic that is generated based on a line voltage HV.

Current source 200 comprises a conversion circuit 21, a current generation circuit 22 and a control circuit 23. Conversion circuit 21 is configured to convert the line voltage HV into a second voltage V2 that is smaller than the line voltage HV, for example, to convert a line voltage of 300 volts into a second voltage of 70 volts. Wherein the line voltage HV and the second voltage V2 are both DC voltages.

Current generation circuit 22 is coupled to conversion circuit 21 and control circuit 23. Current generation circuit 22 is configured to receive the second voltage V2 and to generate a charging current Ic at an output of current generation circuit 22 based on the second voltage V2. Charging current Ic charges the capacitor C1 to generate a supply voltage VCC.

Control circuit 23 is coupled to current generation circuit 22, and is configured to receive supply voltage VCC and an external control signal SHUT. Control circuit 23 is configured to control the current generation circuit 22 based on supply voltage VCC and the external control signal SHUT. When supply voltage VCC is lower than a first threshold voltage, control circuit 23 controls the current generation circuit 22 so that charging current Ic generated by current generation circuit 22 is at a first current value, wherein the first current value is relatively small or may be expressed as: Ic<Ith1. When supply voltage VCC is higher than a second threshold voltage, control circuit 23 controls current generation circuit 22 so that charging current Ic generated by current generation circuit 22 is at a second current value, wherein the second current value is relatively large or may be expressed as: Ic>Ith2. Wherein the second threshold voltage is higher than the first threshold voltage, and the second current value is higher than the first current value, expressed as: Ith2>Ith1. When the external control signal SHUT is in a predetermined state and supply voltage VCC is higher than a threshold voltage, control circuit 23 controls current generation circuit 22 to enter into an OFF state to decrease charging current Ic to zero. In one embodiment, when supply voltage VCC is higher than a third threshold voltage, the external control signal SHUT is in the predetermined state. In another embodiment, when an output voltage of a converter is higher than a threshold voltage, the external control signal SHUT is in the predetermined state. It should be known that, "the first threshold voltage", "the second threshold voltage" and "the third threshold voltage" may not indicate real signals but some abstract values, for example, "the first threshold voltage" may be related to the gate voltage of transistor MN3 which ensures transistor MN3 is in an OFF state, "the second threshold voltage" may be related to the gate voltage of MOSFET MN3 which ensures transistor MN3 in an ON state. The term "external signal" herein only indicates that the signal can be generated outside of current source 200, without the limitation of outside of an integrated circuit, outside of the control circuit or outside of the converter.

Figure 3:
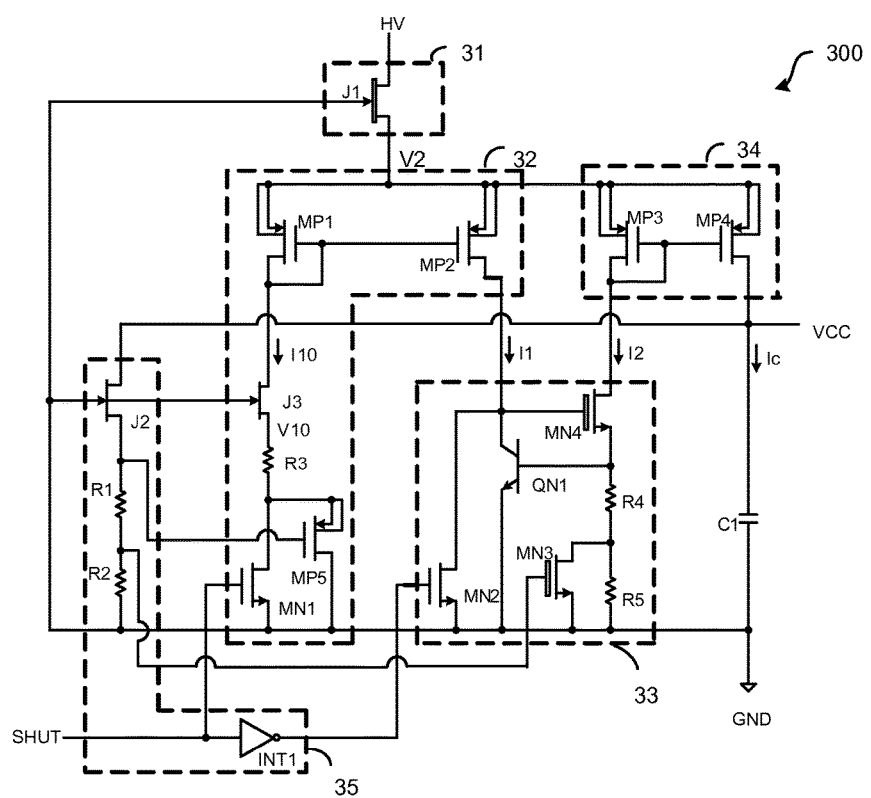
FIG. 3 illustrates a schematic diagram of a current source 300 in accordance with an embodiment of the present invention.

FIG. 3 illustrates a schematic diagram of a current source 300 in accordance with an embodiment of the present invention. Current source 300 comprises a conversion circuit 31, a current generation circuit and a control circuit 35. Current generation circuit comprises a first current generation circuit 32, a second current generation circuit 33 and a current mirror 34.

Convertion circuit 31 is configured to convert a line voltage HV into a second voltage V2 that is lower than the line voltage HV. Conversion circuit 31 comprises a Junction Field Effect Transistor (JFET) J1. A first end of JFET J1 is configured as an input of conversion circuit 31 and is coupled to a line voltage node to receive the line voltage HV, a second end of JFT J1 is configured as an output of conversion circuit 31 and is coupled to the current generation circuit to provide the second voltage V2, and the control end of JFET J1 is coupled to the ground GND. In another embodiment, the control end of JFET J1 may be coupled to other nodes, such as a node of control circuit 35. In one embodiment, JFET J1 is a high voltage JFET having a breakdown voltage of about 700V. In one embodiment, JFET J1 converts a 300V line voltage into a 30V second voltage V2.

First current generation circuit 32 is configured to generate a first current I1 based on the second voltage V2. The first current generation circuit 32 comprises transistors J3, MPS, MN1, MP1, MP2 and a resistor R3, wherein transistor MP1 and transistor MP2 together form a current mirror. Transistor MP1 as shown is a Metal Oxide Semiconductor Field Effect Transistor (MOSFET), wherein the source of transistor MP1 is coupled to conversion circuit 31 to receive the second voltage V2, the drain of transistor MP1 is coupled to transistor J3, the gate and the drain of transistor MP1 are shorted together. Transistor J3 is a JFET, wherein the source of transistor J3 is coupled to transistor MP1, the drain of transistor J3 is coupled to a first end of resistor R3, and the control end of transistor J3 is coupled to the ground GND. Resistor R3 is coupled between the drain of transistor J3 and the source of transistor MP5. Thus, resistor R3, transistor J3 and transistor MP1 are coupled in series. Transistor MN1 and transistor MP5 are configured to selectively provide a first conducting path and a second conducting path of first current generation 32. Thus, transistor MN1 and transistor MP5 may be respectively referred to as a first conducting switch and a second conducting switch of first current generation 32. The first conducting switch MN1 and the second conducting switch MP5 are coupled in parallel. The drain of transistor MP5 is coupled to the ground GND, the control end of transistor MP5 is coupled to control circuit 35 and transistor MP5 is thus controlled by control circuit 35. When supply voltage VCC is about zero, such as when supply voltage VCC is lower than a threshold voltage, transistor MP5 is in an ON state and transistor MN1 is in an OFF state. When supply voltage VCC increases and reaches a threshold voltage, transistor MN1 is turned on and transistor MP5 is turned off. Transistor MN1 is coupled between a second end of resistor R3 and the ground GND, the control end of transistor MN1 is coupled to control circuit 35. When supply voltage VCC continues to increase and an external control signal SHUT is in a predetermined state, such as LOW state, transistor MN1 is also turned off. The source of transistor MP2 is coupled to the output of conversion circuit 31, the drain of transistor MP2 is coupled to the second current generation circuit 33, and the gate of transistor MP2 is coupled to the gate of transistor MP1. Transistor J3 converts the second voltage V2 into a voltage which is lower than the second voltage V2. When either transistor MP5 or transistor MN1 is turned on, the first transistor (transistor MP1) of current mirror, JFET J3, resistor R3 and either the first conducting switch MN1 or the second conducting switch MP5 together form a current path to generate a base current I10. In one embodiment, the value of base current I10 is determined by the second voltage V2, the forward voltage of transistor J3 and the resistance of resistor R3. Current mirror consisting of the first transistor MP1 and the second transistor MP2 mirrors base current I10 and outputs a first current I1 at an output of the first current generation circuit 32, wherein the first current I1 is proportional to the base current I10. In one embodiment, base current I10 is smaller than the first current I1.

Second current generation circuit 33 is configured to generate a second current I2 based on the first current I1. Second current generation circuit 33 comprises a bipolar QN1, a third transistor MN2, a fourth transistor MN3, a fifth transistor MN4, a first current regulating resistor R4 and a second current regulating resistor R5. The first current regulating resistor R4 and the second current regulating resistor R5 are coupled in series. In detail, a second end of resistor R4 is coupled to a first end of resistor R5. The collector of bipolar QN1 is coupled to the output of first current generation circuit 32 to receive first current I1, the emitter of bipolar QN1 is coupled to the ground GND and the base of bipolar QN1 is coupled to a first end of resistor R4. A second end of resistor R5 is coupled to the ground GND. Transistor MN2 is coupled between the ground GND and the output of the first current generation circuit 32 and the control end of transistor MN2 is coupled to control circuit 35. Under the control of control circuit 35, transistor MN2 is turned on and transistor MN4 is turned off when the external control signal SHUT is in a predetermined state. Transistor MN4 is coupled between resistor R4 and the output of second current generation circuit 33.

Current mirror 34 comprises transistors MP3 and MP4. Current mirror 34 is configured to mirror and amplifier the second current I2 at a first end of current mirror 34, and to provide a charging current Ic at a second end of current mirror 34 to charge capacitor C1. Wherein the gate of transistor MP3 and the gate of transistor MP4 are shorted together, the source of transistor MP3 and the source of transistor MP4 are shorted together and configured to receive the second voltage V2, the gate and the drain of transistor MP3 are shorted together, and the drain of transistor MP3 is coupled to the output of the second current generation circuit 33 for allowing the second current I2 to flow through transistor MP3. The drain of the transistor MP4 is configured as an output of the current mirror 34 as well as an output of the current source 300, and charging current Ic flows through the conducting path formed by the source and the drain of transistor MP3. In one embodiment, transistor MP4 and transistor MP3 respectively comprise multiple MOSFET transistor cells that are coupled in parallel and fabricated by the same manufacturing process. In one embodiment, the number of the transistor cells of transistor MP4 is M times of that of transistor MP3 so that charging current Ic is M times of the second current I2, expressed as: Ic=M*I2. The startup time of the conversion system is controlled by adjusting charging current Ic.

Control circuit 35 is configured to control the second current generation circuit 33 to output a small charging current Ic when supply voltage VCC is low, to output a large charging current Ic when supply voltage VCC is high, and to shut down current source 300 to decrease charging current Ic to zero when the conversion system operates in the normal state, such as when supply voltage VCC is higher than a third threshold voltage and the external control signal SHUT is in a predetermined state, such as LOW state. Control circuit 35 comprises a JFET J2, a resistor R1, a resistor R2 and an invertor INT1. Wherein JFET J2, resistor R1 and resistor R2 are coupled in series. The drain of JFET J2 is coupled to supply voltage VCC and the resistor R2 is coupled the ground GND. A first control signal is provided at the connection node of transistor J2 and resistor R1 to control the first current generation circuit 32 to provide a current during the startup period of the system. In one embodiment, transistor J2 is a JFET having a pinch-off voltage of 8 volts, wherein the voltage at the source end (source voltage) of transistor J2 varies with supply voltage VCC when supply voltage VCC is lower than 8V, and the source voltage is fixed at 8V when supply voltage VCC is higher than 8V. The pinch-off voltage of transistor J2 decreases the power consumption of the conversion system when supply voltage VCC is high on the one hand, and guarantees the current supply and the short circuit protection when supply voltage VCC is relative low on the other hand. In addition, a second control signal is provided at the connection node of resistors R1 and R2 to control the second current generation circuit 33 so that the second current I2 is controlled. Thus, the first control signal and the second control signal increases or decreases accordingly with the increase or decrease of supply voltage VCC when supply voltage VCC is low. An input of invertor INT1 is coupled to the external control signal SHUT and the first current generation circuit 32, and an output of invertor INT1 is coupled to the second current generation circuit 33. When the conversion system operates in the normal state, such as when supply voltage VCC is higher than the third threshold voltage, the external signal SHUT is in the predetermined state, for example, logic low, and the first current generation circuit 32 is thus shut down. When the conversion system operates in the normal state and the external control signal SHUT is in the predetermined state, transistor MN2 is turned on and transistor MN4 is turned off through invertor INT1, thus shutting off the second current generation circuit 33.

Supply voltage VCC is zero when the conversion system just starts up. At this time, the voltage at the connection node of transistor J2 and resistor R1 is zero, and P-type transistor MP5 is thus in the ON state. Consequently, transistors MP1 and J3, resistor R3 and transistor MP5 form a current path to provide a base current I10 generated based on the second voltage V2, wherein the base current I10 may be regulated by adjusting the resistance of resistor R3. In one embodiment, transistor J3 has a pinch-off voltage that clamps the source voltage of transistor J3 at this pinch-off voltage. Thus, transistor J3 converts the second voltage V2 into a voltage V10 which is lower than the second voltage V2, and the base current is thus I10≈V10/R3. Take a 8V pinch-off voltage of transistor J3 for example, the source voltage of transistor J3 is clamped at 8V, and accordingly so is the voltage V10. Transistors MP1 and MP22 mirror the base current I10 and output the first current I1 at the output of the first current generation circuit 32, wherein the first current I1 is proportional to the base current I10. The first current I1 controls the voltage Vbe between the base and the emitter of bipolar QN1 in the second current generation circuit 33, and the voltage Vbe is configured to control the second current I2.

When supply voltage VCC is low, the voltage at the connection node of resistors R1 and R2 is low correspondingly. When the voltage at the connection node is lower than a first threshold voltage, such as when the voltage at the connection node is lower than the on-threshold voltage Vgs of transistor MN3, expressed as:

$$VCC < \left(1 + \frac{R1}{R2}\right) * Vgs,$$

transistor MN3 is in an OFF state, and correspondingly the second current I2 is:

$$I2 = \frac{Vbe}{R4 + R5},$$

and charging current Ic is:

$$Ic = M * \frac{Vbe}{R4 + R5}.$$

Resistor R5 may have a relatively high resistance so that the second current I2 as well as the corresponding charging current Ic is controlled to have a small value when supply voltage VCC is smaller than the first threshold voltage, such as $$\left(1 + \frac{R1}{R2}\right) * Vgs,$$

during the startup of the conversion system. In this way, when supply voltage VCC is close to zero, charging current Ic is relative small to protect the system. The heat will increase sharply to destroy the system when the output of the current source is shorted. The short circuit protection during the startup of the conversion system is thus realized. In one embodiment, resistors R4 and R5 are both high-sheet polysilicon resistors, which have a temperature compensation coefficient that ensures the charging current immune to the temperature.

Supply voltage VCC increases gradually when being charged by charging current Ic. When supply voltage VCC rises beyond a second threshold voltage, such as:

$$2 * \left(1 + \frac{R1}{R2}\right) * Vgs,$$

transistor MN3 is fully turned on, thus shorting resistor R5. As a result, the second current I2 increases to $$I2 = \frac{Vbe}{R4}$$

and charging current Ic increases to $$Ic = M * \frac{Vbe}{R4}.$$

Thus, charging current Ic can charge capacitor C1 quickly, supply voltage VCC raises fast and the charge efficiency is improved. The threshold voltage for short circuit protection may be regulated by adjusting the ratio of the resistance of resistor R1 to the resistance of resistor R2. When supply voltage VCC is smaller than the threshold voltage for short circuit protection, control circuit 35 provides short circuit protection by clamping charging current Ic.

When supply voltage VCC is low, a logic circuit inside of a controller of the conversion system is out of operation, the external control logic signal and an output signal provided by invertor INT1 are both in a LOW state, thus, N-type transistors MN1 and MN2 are both in the OFF state. With the increase of supply voltage VCC, the logic circuit inside of the controller starts to operate normally, the external control logic signal SHUT is in a High state, transistor MN1 is thus turned on. At this time, the transistor MN2 remains in the OFF state as the output signal of invertor INT1 is in the LOW state. P-type transistor MP5 is turned off when transistor MN1 is turned on and supply voltage VCC increases, and accordingly transistors MP1, J3 and MN1 and resistor R3 together form a current path to generate the base current I10.

When supply voltage VCC increases and reaches the third threshold voltage, such as an under-voltage lock out voltage UVLO of the conversion system, the conversion system enters into the normal state and the external control signal SHUT transits from the HIGH state to the LOW state. Thus, the output signal provided by inverter INT1 is in a HIGH state to turn off transistor MN1 and to turn on transistor MN2. The collector voltage of transistor QN1 and the gate voltage of transistor MN4 are all pulled down to the ground GND as transistor MN2 is turned on, transistor QN1 and transistor MN4 are thus both turned off, and correspondingly, the current path is cut off and the second current I2 decreases to zero. On the other hand, charging current Ic decreases to zero accordingly, and current source 300 is turned off. Now, an auxiliary secondary winding of the conversion system operates normally to supply power to the conversion system, current source 300 is turned off to reduce the power consumption of the conversion system.

Transistors J1, J2 and J3 as shown in FIG. 3 are N-type JFETs, transistors MP1, MP2, MP3, MP4 and MP5 are P-type MOSFETs, transistors MN1, MN2, MN3 and MN4 are N-type MOSFETs, transistor QN1 is an N-type bipolar. It should be known that N-type transistor or P-type transistor as shown may be interchanged for the same functions by combing different doping type with different logic state. So the doping types shown in FIG. 3 are only for illustration, N-type transistor may be replaced by P-type transistor and P-type transistor may be replaced by N-type transistor.

Figure 4:
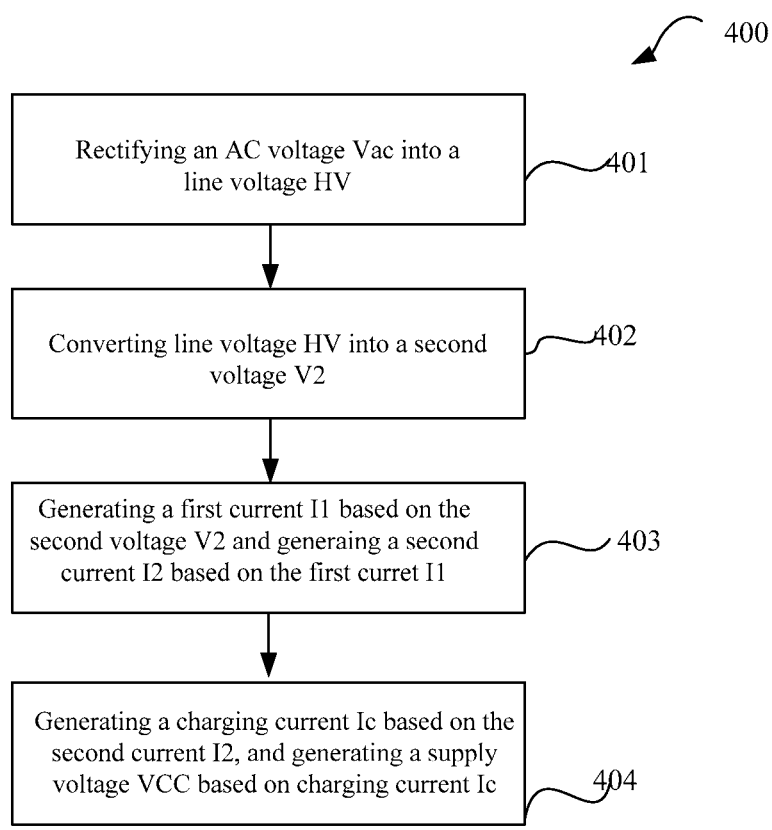
FIG. 4 illustrates a workflow of method 400 of supplying power to an isolation converter with short circuit protection in accordance with an embodiment of the present invention.

FIG. 4 illustrates a workflow of method 400 of supplying power to an isolation converter with short circuit protection in accordance with an embodiment of the present invention. Method 400 comprises step 401-404. In step 401, rectifying an AC voltage Vac into a line voltage HV. In step 402, converting the line voltage HV into a second voltage V2 which is lower than the line voltage HV. In one embodiment, the line voltage HV is converted into the second voltage V2 through a Junction Field Effect Transistor. In step 403, generating a first current I1 based on the second voltage V2 and further generating a second current I2 based on the first current I1. In one embodiment, the step 403 comprises converting the second voltage V2 into the first current I1 through a resistor, and then controlling the base-emitter voltage or the base-collector voltage of a bipolar with the first current I1, and further converting the base-emitter voltage or the base-collector voltage into the second current I2 through a resistor. In step 404, generating a charging current Ic through a current mirror based on the second current I2, wherein charging current Ic is proportional to and larger than the second current I2. A supply voltage VCC is generated by charging a capacitor with charge current Ic, wherein by controlling the resistance of the resistor through which the base-emitter voltage or the base-collector voltage of a bipolar is converted into the second current I2, the second current I2 is controlled to have a small value when supply voltage VCC is relatively low, and to have a large value when supply voltage VCC is relatively high, so as to realize the short circuit protection when supply voltage VCC is close to zero on the one hand and to guarantee that supply voltage VCC can increase fast on the other hand. In one embodiment, when supply voltage VCC is smaller than a first threshold voltage Vth1, the second current I2 is controlled to be small by controlling a first current regulating resistor and a second regulating resistor; when supply voltage VCC is larger than a second threshold voltage Vth2, second current I2 is controlled to be large by shorting the second current regulating resistor. Wherein the second threshold voltage Vth2 may be larger than or equal to the first threshold voltage Vth1. As charging current Ic is proportional to the second current I2, charging current Ic is controlled to have a first value or Ic<Ith1 when supply voltage VCC is lower than the first threshold voltage Vth1, and charging current Ic is controlled to have a second value or Ic>Ith2 when supply voltage VCC is higher than the second threshold voltage Vth2, wherein the second value is higher than the first value, namely Ith2>Ith1. In one embodiment, the first threshold voltage and the second threshold voltage is the threshold voltage that controls the transistor respectively. Method 400 may further comprise controlling the first current, the second current and the charging current to be zero when supply voltage VCC is higher than a third threshold voltage, wherein the third threshold voltage is higher than the second threshold voltage. In one embodiment, the first current, the second current and the charging current are controlled to be zero when an output voltage of the isolation converter is larger than a predetermined voltage.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A current source having an input and an output, wherein the current source is configured to receive a line voltage at the input, and to provide a charging current at the output, and wherein the charging current is provided to charge a capacitor to generate a supply voltage at the output of the current source, the current source comprising:
   a conversion circuit configured to convert the line voltage into a second voltage which is lower than the line voltage;
   a current generation circuit configured to receive the second voltage and to generate the charging current; and
   a control circuit coupled to the current generation circuit, wherein the control circuit is configured to receive the supply voltage, and to control the current generation circuit based on the supply voltage;
   wherein the control circuit is configured to control the current generation circuit such that the charging current is at a first current value when the supply voltage is lower than a first threshold voltage and at a second current value when the supply voltage is higher than a second threshold voltage, wherein the first threshold voltage is lower than the second threshold voltage, and the first current value is lower than the second current value;
   wherein the current generation circuit comprises:
   a first current generation circuit configured to generate a first current based on the second voltage;

a second current generation circuit configured to generate a second current based on the first current, wherein the second current generation circuit comprises a bipolar junction transistor, and the second current is regulated by controlling the base-emitter voltage of the bipolar junction transistor with the first current; and a current mirror having an input and an output, wherein the current mirror is configured to receive the second current at the input, and to provide the charging current proportional to the second current at the output;

wherein the first current generation circuit comprises:

a first JFET;

a resistor coupled to the first JFET in series;

a first conducting switch coupled to the resistor in series;

a second conducting switch coupled to the first conducting switch in parallel, wherein the control ends of the first conducting switch and of the second conducting switch are coupled to the control circuit; and a current mirror comprising a first transistor coupled to the first JFET and a second transistor, wherein when either the first conducting switch or the second conducting switch is turned on, the first transistor of the current mirror, the first JFET and the resistor together form a current path to provide a base current, and the second transistor of the current mirror provides the first current which is proportional to the base current.

2. The current source of claim 1, wherein when the supply voltage is higher than a third threshold voltage, the control circuit is further configured to shut down the current generation circuit so that the charging current is decreased to zero, wherein the third threshold voltage is higher than the second threshold voltage.

3. The current source of claim 1, wherein the first conducting switch is turned off and the second conducting switch is turned on when the supply voltage is zero;

the first conducting switch is turned on and the second conducting switch is turned off when the supply voltage increases to a threshold voltage; and the first conducting switch and the second conducting switch are turned off when the supply voltage continues to increase to a third threshold voltage and an external control signal is in a predetermined state.

4. The current source of claim 1, wherein the first JFET has a pinch-off voltage.

5. A current source having an input and an output, wherein the current source is configured to receive a line voltage at the input, and to provide a charging current at the output, and wherein the charging current is provided to charge a capacitor to generate a supply voltage at the output of the current source, the current source comprising:

a conversion circuit configured to convert the line voltage into a second voltage which is lower than the line voltage;

a current generation circuit configured to receive the second voltage and to generate the charging current; and a control circuit coupled to the current generation circuit, wherein the control circuit is configured to receive the supply voltage, and to control the current generation circuit based on the supply voltage;

wherein the control circuit is configured to control the current generation circuit such that the charging current is at a first current value when the supply voltage is lower than a first threshold voltage and at a second current value when the supply voltage is higher than a second threshold voltage, wherein the first threshold voltage is lower than the second threshold voltage, and the first current value is lower than the second current value;

wherein the current generation circuit comprises:

a first current generation circuit configured to generate a first current based on the second voltage;

a second current generation circuit configured to generate a second current based on the first current, wherein the second current generation circuit comprises a bipolar junction transistor, and the second current is regulated by controlling the base-emitter voltage of the bipolar junction transistor with the first current; and a current mirror having an input and an output, wherein the current mirror is configured to receive the second current at the input, and to provide the charging current proportional to the second current at the output;

wherein the second current generation circuit has an input and an output, the input of the second current generation circuit is coupled to the output of the first current generation circuit, and the second current generation circuit is configured to provide the second current at the output, and wherein a collector of the bipolar junction transistor is coupled to the input of the second current generation circuit, and an emitter of the bipolar junction transistor is coupled to a ground, and further wherein the second current generation circuit comprises:

a third transistor coupled between the input of the second current generation circuit and the ground, wherein a control end of the third transistor is coupled to the control circuit;

a first current regulating resistor having a first end coupled to a base of the bipolar junction transistor and a second end;

a second current regulating resistor having a first end coupled to the second end of the first current regulating resistor, and a second end coupled to the ground;

a fourth transistor coupled between the first end and the second end of the second current regulating resistor, wherein the control end of the fourth transistor is coupled to the control circuit; and a fifth transistor coupled between the first end of the first current regulating resistor and the output of the second current generation circuit, wherein the control end of the fifth transistor is coupled to the input of the second current generation circuit;

wherein when the supply voltage is higher than the second threshold voltage, the fourth transistor is turned on to short the second current regulating resistor so that the second current is increased.

6. The current source of claim 5, the control circuit is configured to turn on the third transistor and to turn off the fifth transistor when an external control signal is in a predetermined state.

7. The current source of claim 5, wherein the charging current is regulated by adjusting the resistance of the first current regulating resistor or the resistance of the second current regulating resistor.

8. The current source of claim 5, wherein the first current regulating resistor and the second current regulating resistor are high-sheet poly silicon resistors with a temperature compensation coefficient.

9. A current source having an input and an output, wherein the current source is configured to receive a line voltage at the input, and to provide a charging current at the output, and wherein the charging current is provided to charge a capacitor to generate a supply voltage at the output of the current source, the current source comprising:
- a conversion circuit configured to convert the line voltage into a second voltage which is lower than the line voltage;
- a current generation circuit configured to receive the second voltage and to generate the charging current; and
- a control circuit coupled to the current generation circuit, wherein the control circuit is configured to receive the supply voltage, and to control the current generation circuit based on the supply voltage;
- wherein the control circuit is configured to control the current generation circuit such that the charging current is at a first current value when the supply voltage is lower than a first threshold voltage and at a second current value when the supply voltage is higher than a second threshold voltage, wherein the first threshold voltage is lower than the second threshold voltage, and the first current value is lower than the second current value;
- wherein the current generation circuit comprises:
- a first current generation circuit configured to generate a first current based on the second voltage;
- a second current generation circuit configured to generate a second current based on the first current, wherein the second current generation circuit comprises a bipolar junction transistor, and the second current is regulated by controlling the base-emitter voltage of the bipolar junction transistor with the first current; and
- a current mirror having an input and an output, wherein the current mirror is configured to receive the second current at the input, and to provide the charging current proportional to the second current at the output;
- wherein the control circuit comprises:
- a series circuit having a first end and a second end and comprising a first JFET, a first resistor and a second resistor, wherein the first JFET, the first resistor and the second resistor are coupled in series, and the series circuit is configured to receive the supply voltage at a first end, and is coupled to the ground at a second end, and wherein a first control signal is provided at a connection node of the first JFET and the first resistor to control the first current generation circuit to generate the first current when the first current generation circuit starts up, and a second control signal is provided at a connection node of the first resistor and the second resistor to control the second current; and
- an inverter having an input coupled to the first current generation circuit, and an output coupled to the second current generation circuit, wherein the inverter is configured to receive an external control signal and to turn off the first current generation circuit and the second current generation circuit when the external control signal is in a predetermined state.

10. The current source of claim 9, wherein the first JFET has a pinch-off voltage.

11. The current source of claim 9, wherein a threshold voltage for short circuit protection is regulated by adjusting the ratio of the resistance of the first resistor to the resistance of the second resistor.

12. The current source of claim 1, wherein the conversion circuit comprises a second JFET having a first end and a second end, the second JFET is configured to receive the line voltage at the first end, and to provide the second voltage at the second end which is coupled to the current generation circuit.

13. The current source of claim 12, wherein the second JFET further has a control end coupled to a ground.

14. The current source of claim 5, wherein when the supply voltage is higher than a third threshold voltage, the control circuit is further configured to shut down the current generation circuit so that the charging current is decreased to zero, wherein the third threshold voltage is higher than the second threshold voltage.

15. The current source of claim 5, wherein the conversion circuit comprises a JFET having a first end and a second end, the JFET is configured to receive the line voltage at the first end, and to provide the second voltage at the second end which is coupled to the current generation circuit.

16. The current source of claim 15, wherein the JFET further has a control end coupled to a ground.

17. The current source of claim 9, wherein when the supply voltage is higher than a third threshold voltage, the control circuit is further configured to shut down the current generation circuit so that the charging current is decreased to zero, wherein the third threshold voltage is higher than the second threshold voltage.

18. The current source of claim 9, wherein the conversion circuit comprises a second JFET having a first end and a second end, the second JFET is configured to receive the line voltage at the first end, and to provide the second voltage at the second end which is coupled to the current generation circuit.

19. The current source of claim 18, wherein the second JFET further has a control end coupled to a ground.

* * * * *